US012658167B2

(12) United States Patent
Bradley et al.

(10) Patent No.: US 12,658,167 B2
(45) Date of Patent: Jun. 16, 2026

(54) ENHANCED SYSTEM, METHOD, AND DEVICES FOR PROCESSING INAUDIBLE TONES ASSOCIATED WITH AUDIO FILES

(71) Applicant: Datavault AI Inc., Beaverton, OR (US)

(72) Inventors: Nathaniel T. Bradley, Tucson, AZ (US); Joshua S. Paugh, Tucson, AZ (US); Sonia Choi, New York, NY (US)

(73) Assignee: Datavault AI Inc., Beaverton, OR (US)

( * ) Notice: Subject to any disclaimer, the term of this patent is extended or adjusted under 35 U.S.C. 154(b) by 0 days.

(21) Appl. No.: 17/319,690

(22) Filed: May 13, 2021

(65) Prior Publication Data

US 2021/0264887 A1 Aug. 26, 2021

Related U.S. Application Data

(63) Continuation of application No. 16/547,964, filed on Aug. 22, 2019, now Pat. No. 11,030,983, which is a continuation-in-part of application No. 16/506,670, filed on Jul. 9, 2019, now Pat. No. 10,878,788, which is a continuation of application No. 16/019,257, filed on Jun. 26, 2018, now Pat. No. 10,460,709.

(60) Provisional application No. 62/524,835, filed on Jun. 26, 2017.

(51) Int. Cl.
*G10H 1/00* (2006.01)
*G10H 1/40* (2006.01)

(52) U.S. Cl.
CPC ............. *G10H 1/0008* (2013.01); *G10H 1/40* (2013.01); *G10H 2210/066* (2013.01); *G10H 2220/005* (2013.01); *G10H 2220/121* (2013.01); *G10H 2240/091* (2013.01); *G10H 2240/325* (2013.01)

(58) Field of Classification Search
CPC .... G09B 15/00; G10H 1/0008; G10H 1/0025; G10H 2210/145; G10H 2210/155; G10H 2240/305; G10H 2220/015; G10H 2220/005; G10H 2220/121; G10H 2210/091; G10H 2240/026; G10H 1/0083; G10H 2240/115; G10H 2240/171; G10H 1/365; G10H 2220/211; G10H 1/40; G10H 2210/066; G10H 2240/091; G10H 2240/325
USPC ........................................................... 84/609
See application file for complete search history.

(56) References Cited

U.S. PATENT DOCUMENTS

| | | | |
|---|---|---|---|
| 4,399,731 | A | 8/1983 | Aoki |
| 4,479,416 | A | 10/1984 | Clague |
| 4,694,723 | A | 9/1987 | Shinohara et al. |

(Continued)

FOREIGN PATENT DOCUMENTS

| | | | | |
|---|---|---|---|---|
| ES | 2894730 T3 * | 2/2022 | .......... | H04N 21/812 |
| WO | WO-0105075 A1 * | 1/2001 | ............ | H04H 20/31 |

*Primary Examiner* — Christina M Schreiber
(74) *Attorney, Agent, or Firm* — Goodhue, Coleman & Owens, P.C.

(57) ABSTRACT

One embodiment provides a system, method, and device for processing inaudible tones. Content is received from one or more sources. One or more inaudible tones included in the content are detected. Information is associated with the one or more inaudible tones from the content are extracted. Usage information associated with the content is determined in response to the information. The usage information includes at least licensing information and content information. The usage information is communicated to one or more parties associated with the content.

20 Claims, 8 Drawing Sheets

(56) References Cited

U.S. PATENT DOCUMENTS

| | | | |
|---|---|---|---|
| 4,976,182 | A | 12/1990 | Obuchi et al. |
| 5,275,082 | A | 1/1994 | Kestner-Clifton et al. |
| 5,315,911 | A | 5/1994 | Ochi |
| 5,413,486 | A | 5/1995 | Burrows et al. |
| 5,533,903 | A | 7/1996 | Kennedy |
| 5,563,358 | A | 10/1996 | Zimmerman |
| 5,621,538 | A | 4/1997 | Gnant et al. |
| 5,690,496 | A | 11/1997 | Kennedy |
| 5,728,960 | A | 3/1998 | Sitrick |
| 5,746,605 | A | 5/1998 | Kennedy |
| 5,760,323 | A | 6/1998 | Romero et al. |
| 5,768,127 | A | 6/1998 | Murata |
| 5,773,741 | A | 6/1998 | Eller et al. |
| 5,931,680 | A | 8/1999 | Semba |
| 6,072,113 | A | 6/2000 | Tohgi et al. |
| 6,084,168 | A | 7/2000 | Sitrick |
| 6,096,962 | A | 8/2000 | Crowley |
| 6,156,964 | A | 12/2000 | Sahai et al. |
| 6,211,451 | B1 | 4/2001 | Tohgi et al. |
| 6,235,979 | B1 | 5/2001 | Yanase |
| 6,275,222 | B1 | 8/2001 | Desain |
| 6,348,648 | B1 | 2/2002 | Connick |
| 6,380,471 | B2 | 4/2002 | Matsumoto |
| 6,380,474 | B2 | 4/2002 | Taruguchi et al. |
| 6,392,132 | B2 | 5/2002 | Uehara |
| 6,483,019 | B1 | 11/2002 | Hamilton |
| 6,486,388 | B2 | 11/2002 | Akahori |
| 6,504,089 | B1 | 1/2003 | Negishi et al. |
| 6,515,210 | B2 | 2/2003 | Shibukawa |
| 6,545,208 | B2 | 4/2003 | Hiratsuka |
| 6,555,737 | B2 | 4/2003 | Miyaki et al. |
| 6,664,458 | B2 | 12/2003 | Hiratsuka et al. |
| 6,674,861 | B1 | 1/2004 | Xu et al. |
| 6,685,480 | B2 | 2/2004 | Nishimoto et al. |
| 6,686,531 | B1 | 2/2004 | Pennock et al. |
| 6,727,418 | B2 | 4/2004 | Matsumoto |
| 6,738,744 | B2 * | 5/2004 | Kirovski ............... G10L 19/018 704/E19.009 |
| 6,777,607 | B2 | 8/2004 | Smith |
| 6,798,427 | B1 | 9/2004 | Suzuki et al. |
| 6,809,246 | B2 | 10/2004 | Errico |
| 6,831,220 | B2 | 12/2004 | Varme |
| 6,891,958 | B2 * | 5/2005 | Kirovski ................. G06T 1/005 380/282 |
| 7,019,204 | B2 | 3/2006 | Terada |
| 7,020,285 | B1 * | 3/2006 | Kirovski ............... G10L 19/018 382/250 |
| 7,030,307 | B2 | 4/2006 | Wedel |
| 7,041,888 | B2 | 5/2006 | Masuda |
| 7,041,890 | B1 | 5/2006 | Sutton |
| 7,045,698 | B2 | 5/2006 | Miyamoto |
| 7,064,261 | B2 | 6/2006 | Shao |
| 7,078,609 | B2 | 7/2006 | Georges |
| 7,094,960 | B2 | 8/2006 | Ikeya et al. |
| 7,094,962 | B2 | 8/2006 | Kayama |
| 7,105,733 | B2 | 9/2006 | Jarrett et al. |
| 7,119,266 | B1 | 10/2006 | Bittner et al. |
| 7,129,407 | B2 | 10/2006 | Hiratsuka et al. |
| 7,183,476 | B2 | 2/2007 | Swingle et al. |
| 7,199,298 | B2 | 4/2007 | Funaki |
| 7,199,299 | B2 | 4/2007 | Asakura |
| 7,223,912 | B2 | 5/2007 | Nishimoto et al. |
| 7,297,856 | B2 | 11/2007 | Sitrick |
| 7,314,992 | B2 | 1/2008 | Funaki et al. |
| 7,314,994 | B2 | 1/2008 | Hull et al. |
| 7,335,833 | B2 | 2/2008 | Smith et al. |
| 7,342,165 | B2 | 3/2008 | Gotfried |
| 7,371,954 | B2 | 5/2008 | Masuda et al. |
| 7,428,534 | B2 | 9/2008 | Ito et al. |
| 7,439,441 | B2 | 10/2008 | Jarrett et al. |
| 7,482,529 | B1 | 1/2009 | Flamini et al. |
| 7,485,794 | B2 | 2/2009 | Koizumi |
| 7,507,893 | B2 | 3/2009 | Knudsen |
| 7,543,148 | B1 * | 6/2009 | Kirovski ................ H04H 20/31 713/176 |
| 7,560,635 | B2 | 7/2009 | Funaki |
| 7,589,271 | B2 | 9/2009 | Jarrett et al. |
| 7,589,727 | B2 | 9/2009 | Haeker |
| 7,601,905 | B2 | 10/2009 | Yanase et al. |
| 7,605,322 | B2 | 10/2009 | Nakamura |
| 7,640,501 | B2 | 12/2009 | Suzuki et al. |
| 7,642,447 | B2 | 1/2010 | Kojima |
| 7,683,250 | B2 | 3/2010 | Ikeya et al. |
| 7,703,014 | B2 | 4/2010 | Funaki |
| 7,765,314 | B2 | 7/2010 | Okamoto |
| 7,767,898 | B2 | 8/2010 | Nakayama et al. |
| 7,829,777 | B2 | 11/2010 | Kyuma et al. |
| 8,106,282 | B2 | 1/2012 | Lee |
| 8,138,409 | B2 | 3/2012 | Brennan |
| 8,158,874 | B1 | 4/2012 | Kenney |
| 8,319,083 | B2 | 11/2012 | Adams |
| 8,367,921 | B2 | 2/2013 | Evans et al. |
| 8,451,086 | B2 | 5/2013 | Petrovic et al. |
| 8,497,416 | B2 | 7/2013 | Gregson |
| 8,513,511 | B2 | 8/2013 | Ikeya et al. |
| 8,629,342 | B2 | 1/2014 | Lee et al. |
| 8,642,871 | B2 | 2/2014 | Feidner |
| 8,660,678 | B1 | 2/2014 | Lavi et al. |
| 8,680,388 | B2 | 3/2014 | Becker et al. |
| 8,688,250 | B2 * | 4/2014 | Iwase ....................... G10G 1/02 455/414.3 |
| 8,785,757 | B2 | 7/2014 | Pillhofer et al. |
| 8,878,040 | B2 | 11/2014 | Araki et al. |
| 9,006,551 | B2 | 4/2015 | Iwase et al. |
| 9,029,676 | B2 | 5/2015 | Iwase et al. |
| 9,035,162 | B2 | 5/2015 | Hamilton et al. |
| 9,082,380 | B1 | 7/2015 | Hamilton et al. |
| 9,092,992 | B2 | 7/2015 | Yung |
| 9,093,055 | B2 | 7/2015 | Daisy-Cavaleri |
| 9,105,259 | B2 | 8/2015 | Akazawa et al. |
| 9,116,509 | B2 | 8/2015 | Takahashi et al. |
| 9,120,016 | B2 | 9/2015 | Epstein |
| 9,183,754 | B2 | 11/2015 | Tanaka |
| 9,183,841 | B2 * | 11/2015 | Strein ................... G10L 19/018 |
| 9,275,616 | B2 | 3/2016 | Uemura et al. |
| 9,333,418 | B2 | 5/2016 | Lee et al. |
| 9,412,352 | B2 | 8/2016 | Uemura |
| 9,418,638 | B2 | 8/2016 | Soejima |
| 9,424,822 | B2 | 8/2016 | Bisnauth |
| 9,472,178 | B2 | 10/2016 | Kruge |
| 9,545,578 | B2 | 1/2017 | Nathan et al. |
| 9,576,564 | B2 | 2/2017 | Yamauchi et al. |
| 9,601,029 | B2 | 3/2017 | Gebauer |
| 9,601,127 | B2 | 3/2017 | Yang et al. |
| 9,620,095 | B1 | 4/2017 | Hamilton et al. |
| 9,640,160 | B2 | 5/2017 | Wang et al. |
| 10,460,709 | B2 | 10/2019 | Bradley et al. |
| 10,878,788 | B2 * | 12/2020 | Bradley ................... G10H 1/40 |
| 10,909,566 | B2 | 2/2021 | Webster |
| 10,917,693 | B2 | 2/2021 | Webster |
| 11,483,620 | B2 | 10/2022 | Webster |
| 12,488,069 | B2 * | 12/2025 | Vos ....................... G06F 21/105 |
| 2002/0002464 | A1 | 1/2002 | Petrushin |
| 2002/0107691 | A1 * | 8/2002 | Kirovski ............... G10L 19/018 704/E19.009 |
| 2002/0191809 | A1 * | 12/2002 | Kirovski ................... H04L 9/30 382/100 |
| 2004/0003707 | A1 | 1/2004 | Mazzoni |
| 2004/0204943 | A1 * | 10/2004 | Kirovski .......... G11B 20/00884 |
| 2005/0257666 | A1 | 11/2005 | Sakurada |
| 2007/0118544 | A1 | 5/2007 | Lundquist et al. |
| 2008/0304653 | A1 | 12/2008 | Ghani et al. |
| 2012/0084131 | A1 | 4/2012 | Bergel et al. |
| 2012/0197648 | A1 * | 8/2012 | Moloney ............... G10L 19/018 381/56 |
| 2013/0102241 | A1 * | 4/2013 | Devine ................ H04H 20/106 455/3.06 |
| 2014/0056172 | A1 | 2/2014 | Lee et al. |
| 2014/0180675 | A1 | 6/2014 | Neuhauser et al. |
| 2014/0335834 | A1 * | 11/2014 | Emerson, III ........ G06F 16/683 455/414.1 |
| 2015/0023546 | A1 * | 1/2015 | Strein ....................... H04L 9/00 382/100 |
| 2015/0039320 | A1 | 2/2015 | Neuhauser et al. |

(56) References Cited

U.S. PATENT DOCUMENTS

| | | | | |
|---|---|---|---|---|
| 2015/0039496 | A1 | 2/2015 | Shuster | |
| 2016/0104190 | A1 | 4/2016 | Webster et al. | |
| 2017/0025115 | A1 | 1/2017 | Tachibana et al. | |
| 2017/0064246 | A1 | 3/2017 | Kline et al. | |
| 2017/0279542 | A1* | 9/2017 | Knauer | H04L 65/1059 |
| 2018/0152796 | A1 | 5/2018 | Stone et al. | |
| 2018/0242083 | A1 | 8/2018 | Lindemann | |
| 2018/0374460 | A1* | 12/2018 | Bradley | G10H 1/40 |
| 2019/0013879 | A1 | 1/2019 | Webster | |
| 2019/0082203 | A1* | 3/2019 | Bowman | H04N 21/2187 |
| 2019/0082224 | A1 | 3/2019 | Bradley et al. | |
| 2019/0121532 | A1 | 4/2019 | Strader et al. | |
| 2019/0122691 | A1 | 4/2019 | Roy et al. | |
| 2019/0122766 | A1 | 4/2019 | Strader et al. | |
| 2019/0155997 | A1 | 5/2019 | Vos et al. | |
| 2019/0200071 | A1* | 6/2019 | Knauer | H04N 21/4126 |
| 2019/0281354 | A1 | 9/2019 | Webster et al. | |
| 2020/0051534 | A1* | 2/2020 | Bradley | G10H 1/40 |
| 2020/0077184 | A1 | 3/2020 | Mizuno | |
| 2020/0082816 | A1 | 3/2020 | Mahajan | |
| 2020/0286086 | A1 | 9/2020 | Chanduri et al. | |
| 2021/0082380 | A1* | 3/2021 | Bradley | G10H 1/0008 |
| 2021/0160570 | A1 | 5/2021 | Webster | |
| 2021/0264887 | A1* | 8/2021 | Bradley | G10H 1/40 |
| 2021/0274312 | A1* | 9/2021 | Wolcott | H04L 67/51 |
| 2021/0377335 | A1 | 12/2021 | McWilliams | |
| 2021/0398031 | A1 | 12/2021 | Webster | |
| 2021/0406855 | A1 | 12/2021 | Webster | |
| 2024/0015342 | A1* | 1/2024 | Bowman | H04H 60/375 |

* cited by examiner

ENHANCED SYSTEM, METHOD, AND DEVICES FOR PROCESSING INAUDIBLE TONES ASSOCIATED WITH AUDIO FILES

PRIORITY

This application is a continuation of U.S. patent application Ser. No. 16/547,964 entitled Enhanced System, Method, and Devices for Communicating Inaudible Tones Associated with Audio Files filed Aug. 22, 3019 which is a continuation-in-part of U.S. patent application Ser. No. 16/506,670 entitled Enhanced System, Method, and Devices for Capturing Inaudible Tones Associated with Music filed Jul. 9, 2019 which is a continuation of U.S. Utility patent application Ser. No. 16/019,257 entitled Enhanced System, Method, and Devices for Utilizing Inaudible Tones with Music filed on Jun. 26, 2018 which claims priority to U.S. Provisional Patent Application Ser. No. 62/524,835 entitled Enhanced System, Method, and Devices for Utilizing Inaudible Tones with Music filed on Jun. 26, 2017, the entirety of each which is incorporated by reference herein.

BACKGROUND

I. Field of the Disclosure

The illustrative embodiments relate to music. More specifically, but not exclusively, the illustrative embodiments relate to enhancing music through associating available information.

II. Description of the Art

Teaching, learning, and playing music may be very challenging for individuals. It may be even more difficult for students and others with limited exposure to music notes, theory, or instruments. Unfortunately, music advancement has not kept pace with advancements in technology and resources to create, teach, learn, and play music more easily and increase accessibility for individuals of all skill levels, cognition, and abilities.

SUMMARY OF THE DISCLOSURE

The illustrative embodiments provide a system, method, and device for processing inaudible tones. Content is received from one or more sources One or more inaudible tones included in the content are detected. Information is associated with the one or more inaudible tones from the content are extracted. Usage information associated with the content is determined in response to the information. The usage information includes at least licensing information and content information. The usage information is communicated to one or more parties associated with the content. Another embodiment provides a device including a processor for executing a set of instructions and a memory for storing the set of instructions. The set of instructions are executed to perform the method(s) herein described.

Another embodiment provides an inaudible tones device. The inaudible tones device includes a microphone receiving content from one or more sources. The inaudible tones device includes logic in communication with the microphone controlling the inaudible tones device, the logic detects one or more inaudible tones included in the content, extracts information associated with the one or more inaudible tones from the content, determines usage information associated with the content in response to the information, the usage information includes at least licensing information and content information. The inaudible tones device further includes logic in communication with the microphone controlling the inaudible tones device, the logic detects one or more inaudible tones included in the content, extracts information associated with the one or more inaudible tones from the content, determines usage information associated with the content in response to the information, the usage information includes at least licensing information and content information.

Another illustrative embodiment provides a system, method, and device for communicating inaudible tones. An audio file is received. One or more inaudible tones are embedded in the audio file. The information is associated with the inaudible tones. The audio file is distributed with the embedded one or more inaudible tones.

In another embodiment, the audio file may be generated as part of being received. The information may include publishing rights associated with the audio file. In another embodiment, the information may be utilized to authorize playback of the audio file by a device that receives the audio file with the embedded one or more audio tones. The inaudible tones may be utilized to ensure that playback of the audio file by a plurality of users (or devices) is authorized. In another embodiment, one or more inaudible tones may be detected in the audio file, the information associated with the one or more inaudible tones of the audio file may be extracted, a determination may be made whether conditions associated with the information are met, and one or more actions associated with the conditions of the information being met may be performed. The information may include musical note information associated with the audio file. The one or more inaudible tones may be sound waves inaudible to humans.

Another illustrative embodiment provides an inaudible tones device. The inaudible tones device includes logic controlling the inaudible tones device. The inaudible tones device includes a memory in communication with the logic storing one or more audio files and one or more inaudible tones and information associated with each of the one or more audio files. The inaudible tones device includes a speaker in communication with the logic generating the one or more inaudible tones including the information associated with the one or more audio files in response to a command from the logic. The inaudible tones device further includes a battery in communications with the logic, memory, and speaker, powering components of the inaudible tones device.

In another illustrative embodiment, the inaudible tones device may include a microphone receiving inaudible tones from other sources. The logic may extract information from the inaudible tones for communication to one or more users. The information may be communicated to one or more users (or devices) through the speaker or a display in communication with the logic. The inaudible tones device may include a transceiver communicating with one or more devices directly or through a network. The transceiver may be utilized to communicate the inaudible tones, settings and preferences for the inaudible tones device, information associated with the inaudible tones, and other applicable data.

In another illustrative embodiment, the inaudible tones device receives an inaudible tone through the microphone, the logic extracts the information associated with the inaudible tone from the inaudible tone, the logic determines whether conditions associated with the information are met, and the logic performs one or more actions associated with the conditions of the information being met. The conditions may specify information, such as time of day, parties authorized to playback the audio file (or a lookup database), number of performances, authorized performance/playback types, monetization verification, and so forth. The one or more actions may include paying for the audio file, communicating usage information, communicating distribution information, tracking and reporting utilization and distribution, communicating contributor information (e.g., singer, writer, performer, band, copyright bolder, distributor, etc.), and other conditions, criteria, factors, specifications, and so forth.

The illustrative embodiments provide a system, method, and device for capturing inaudible tones from music. A song is received. Inaudible tones are detected in the song. Information associated with the inaudible tones is extracted from the song. The information associated with the inaudible tones is communicated to a user. Another embodiment provides a device including a processor for executing a set of instructions and a memory for storing the set of instructions. The set of instructions are executed to perform the method(s) herein described.

Another embodiment provides a method for utilizing the inaudible tones with music. Music is received utilizing an electronic device including at least a display. Inaudible tones in the music are detected. Information associated with the inaudible tones of the music is extracted. The information associated with the inaudible tones is communicated to a user utilizing at least the display of the electronic device.

Yet another embodiment provides a system for utilizing inaudible tones in music. A transmitting device is configured to broadcast music including one or more inaudible tones. A receiving device receives the music, detects inaudible tones in the music, extracts information associated with the inaudible tones of the music, and communicates information associated with the inaudible tones to a user through the receiving device, wherein the information includes at least notes associated with the music.

Yet another illustrative embodiment provides a system, method, and device for utilizing inaudible tones for music. A song is initiated with enhanced features. A determination is made whether inaudible tones including information or data are associated with a portion of the song. The associated inaudible tone is played. Playback of the song is continued. Another embodiments provides a device including a processor for executing a set of instructions and a memory for storing the set of instructions. The instructions are executed to perform the method described above.

Yet another embodiment provides a method for utilizing inaudible tones for music. Music and inaudible tones associated with the music are receiving utilizing an electronic device including at least a display. Information associated with the inaudible tones is extracted. The information associated with the inaudible tones is communicated. Another embodiments provides a receiving device including a processor for executing a set of instructions and a memory for storing the set of instructions. The instructions are executed to perform the method described above.

Yet another embodiment provides a system for utilizing inaudible tones in music. The system includes a transmitting device that broadcasts music synchronized with one or more inaudible tones. The system includes a receiving device that receives the inaudible tones, extracts information associated with the inaudible tones, and communicates the information associated with the inaudible tones.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

The illustrative embodiments provide a system and method for utilizing inaudible tones integration with visual sheet music, inaudible time codes, musical piece displays, live music capture, execution, and marking, and musical accompaniment suggestions. The illustrative embodiments may be implemented utilizing any number of musical instruments, wireless devices, computing devices, or so forth. For example, an electronic piano may communicate with a smart phone to perform the processes and embodiments herein described. The illustrative embodiments may be utilized to create, learn, play, observe, or teach music.

The illustrative embodiments may utilize inaudible tones to communicate music information, such as notes being played. A visual and text representation of the note, notes, or chords may be communicated. The illustrative embodiments may be utilized for recorded or live music or any combination thereof. The inaudible tones may be received and processed by any number of devices to display or communicate applicable information.

Figure 1:
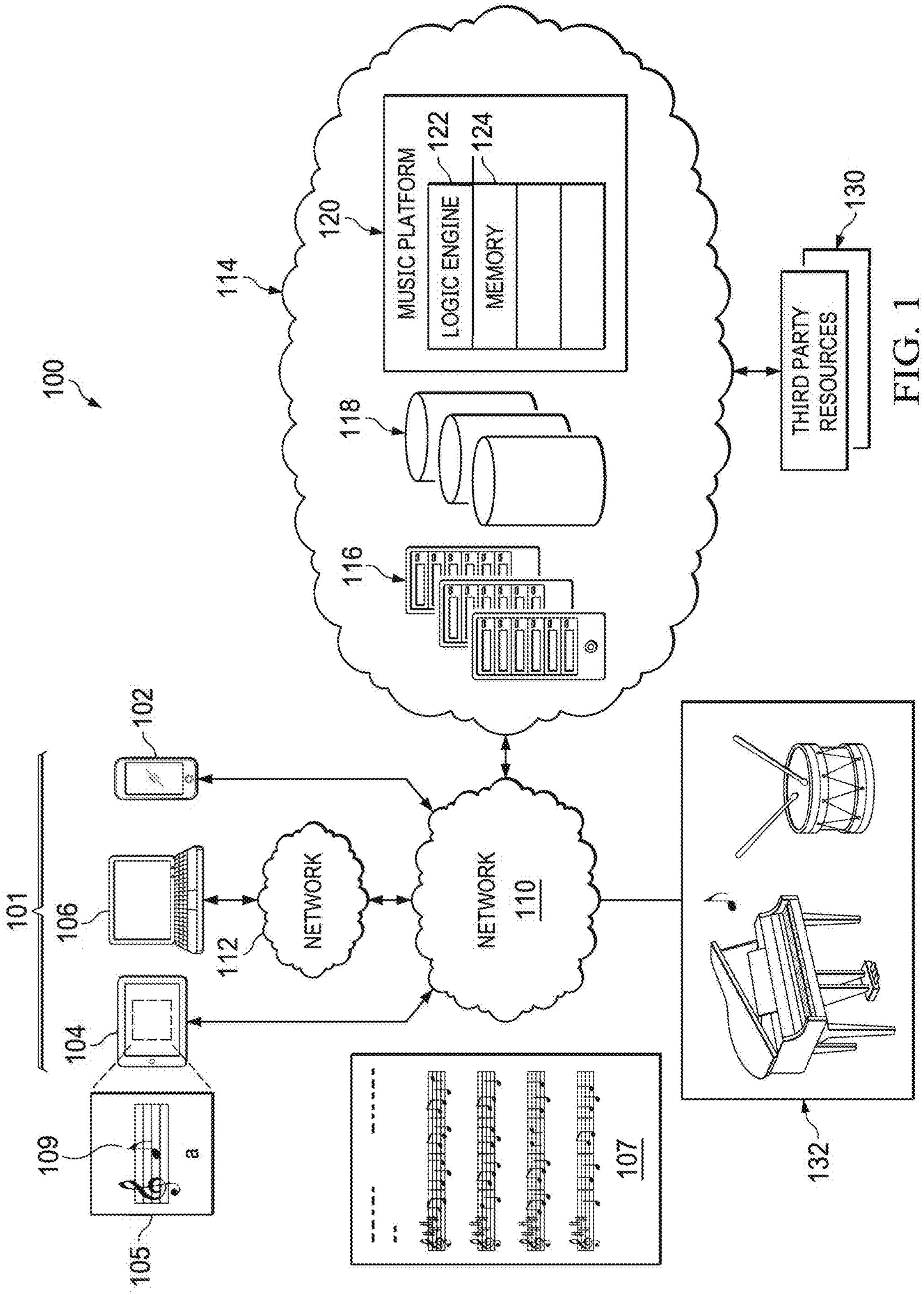
FIG. 1 is a pictorial representation of a system for utilizing inaudible tones in accordance with an illustrative embodiment.

FIG. 1 is a pictorial representation of a system 100 for utilizing inaudible tones in accordance with an illustrative embodiment. In one embodiment, the system 100 of FIG. 1 may include any number of devices 101, networks, components, software, hardware, and so forth. In one example, the system 100 may include a wireless device 102, a tablet 104 utilizing a graphical user interface 105, a laptop 106 (altogether devices 101), a network 110, a network 112, a cloud network 114, servers 116, databases 118, and a music platform 120 including at least a logic engine 122, and memory 224. The cloud network 114 may further communicate with third-party resources 130.

In one embodiment, the system 100 may be utilized by any number of users to learn, play, teach, observe, or review music. For example, the system 100 may be utilized with musical instruments 132. The musical instruments 132 may represent any number of acoustic, electronic, networked, percussion, wind, string, or other instruments of any type. In one embodiment, the wireless device 12, tablet 104, or laptop 106 may be utilized to display information to a user, receiver user input, feedback, commands, and/or instructions, record music, store data and information, play inaudible tones associated with music, and so forth.

The system 100 may be utilized by one or more users at a time. In on embodiment, an entire band, class, orchestra, or so forth may utilize the system 100 at one time utilizing their own electronic devices or assigned or otherwise provided devices. The devices 101 may communicate utilizing one or more of the networks 110, 112 and the cloud network 114 to synchronize playback, inaudible tones, and the playback process. In one embodiment, software operated by the devices of the system 100 may synchronize the playback and learning process. For example, mobile applications executed by the devices 101 may perform synchronization, communications, displays, and the processes herein described. The devices 101 may play inaudible tones as well as detect music, tones, inaudible tones, and input received from the instruments 132.

The inaudible tones discussed in the illustrative embodiments may be produced from the known tone spectrum in an audio range that is undetectable to human ears. The inaudible tone range is used to carry data transmissions to implement processes, perform synchronization, communicate/display information, and so forth. Any number of standard or specialized devices may perform data recognition, decoding, encoding, transmission, and differentiation via the inaudible tone data embedded in the inaudible tones.

The inaudible tones may be combined in various inaudible tone ranges that are undetectable to human ears. The known human tone range of detection can vary from 20 Hz to 20,000 Hz. The illustrative embodiments utilize the inaudible tone spectrum in the ranges of 18 Hz to 20 Hz and 8 kHz to 22 kHz, which both fall under the category of inaudible frequencies. The inaudible tones at 8 kHz, 10 kHz, 12 kHz, 14 kHz, 15 kHz, 16 kHz, 17 kHz, 17.4 kHz, 18 kHz, 19 kHz, 20 kHz, 21 kHz, and 22 kHz may be particularly useful. The illustrative embodiments may also utilize Alpha and Beta tones which use varied rates of inaudible tone frequency modulation and sequencing to ensure a broader range of the inaudible tone frequency spectrum is available from each singular inaudible tone range. The illustrative embodiments may also utilize audible tones to perform the processes, steps, and methods herein described.

The inaudible tones carry data that is processed and decoded via microphones, receivers, sensors, or tone processors. The microphones and logic that perform inaudible tone processing be pre-installed on a single purpose listening device or installed in application format on any standard fixed or mobile device with a built-in microphone and processor. The inaudible tones include broadcast data from various chips or tone transmission beacons, which are recognized and decoded at the microphone and logic.

The devices 101 are equipped to detect and decode data contained in the inaudible signals sent from any number of other sources. The devices 101 as well as the associated inaudible tone applications or features be programmed in an always on, passive listening, scheduled listening mode or based on environmental conditions, location (e.g., school, classroom, field, venue, etc.), or other conditions, settings, and/or parameters. In one embodiment, the music-based data and information may also be associated with the inaudible tones so that it does not have to be encoded or decoded.

The devices 101 may be portable or fixed to a location (e.g., teaching equipment for a classroom). In one embodiment, the devices 101 may be programmed to only decode tones and data specific to each system utilization. The devices 101 may also be equipped to listen for the presence or absence of specific tones and recognize the presence of each specific tone throughout a location or environment. The devices 101 may also be utilized to grant, limit or deny access to the system or system data based on the specific tone.

In one embodiment, the inaudible tones associated with a particular piece of music, data, or information may be stored in the memories of the devices 101 of the system 100, in the databases 118, or the memory 124 of the music platform 120 or in other memories, storage, hardware, or software. Similarly, the devices 101 of the system 100 may execute software that coordinates the processes of the system 100 as well as the playback of the inaudible tones.

In one embodiment, cloud network 114 or the music platform 120 may coordinate the methods and processes described herein as well as software synchronization, communication, and processes. The software may utilize any number of speakers, microphones, tactile components (e.g., vibration components, etc.) graphical user interfaces, such as the graphical user interface 105 to communicate and receive indicators, inaudible tones, and so forth.

The system 100 and devices may utilize speakers and microphones as inaudible tone generators and inaudible tone receivers to link music 107, such as sheet music notation or tablature-based notes to the tempo of a song creating a visual musical score. The process utilizes sound analysis tools on live and pre-produced musical pieces 107 or may be used with other tablature, standard sheet music, and sheet music creation tools (music 107).

The inaudible tone recognition tool ties sheet music 107 to the actual audio version of a song and in real-time to visually broadcasts each note 109 (notes, chord) that each instrument or voice produced during the progression of a song and visually displays the note in conjunction with the rhythm of the song through an inaudible tone. The note 109 may represent a single note, multiple notes, groups or sets of notes, or a chord. As shown, the note 109 may be displayed by the graphical user interface 105 by an application executed by the wireless device 104. The note 109 may be displayed graphically as a music node as well as the associated text or description, such as "a". The note 109 may also indicate other information, such as treble clef or bass clef.

In another embodiment, primary or key notes 109 of the music 107 may be displayed to the devices 101 based on information from the inaudible tones. Alternatively, a user (e.g., teacher, student, administrator, etc.) may select preselect or indicate in real-time the notes 109 from the music 107 to be displayed. The note 109 may be displayed individually or as part of the music 105. For example, the note 109 may light up, move, shake, or be otherwise be animated when played.

As noted, any number of devices 101 may be utilized to display the associated music 105, notes 109, and content. In addition, one of the devices 101 may coordinate the display and playback of information, such as a cell phone, table, server, personal computer, gaming device, or so forth.

Any number of flags, instructions, codes, inaudible tones, or other indicators may be associated with the notes 109, information, instructions, commands, or data associated with the music 107. As a result, the indicators may show the portion of the music being played. The indicators may also provide instructions or commands or be utilized to automatically implement an action, program, script, activity, prompt, display message, or so forth. The indicators may also include inaudible codes that may be embedded within music to perform any number of features or functions.

Inaudible time codes are placed within the piece of music 107 indicating the title and artist, the availability of related sheet music for the song, the start and finish of each measure, the vocal and instrumental notes or song tablature for each measure, and the timing and tempo fluctuations within a measure. The system 100 may also visually pre-indicate when a specific instrument or groups of instruments will enter in on the piece of music 107. Through the utilization of inaudible time codes embedded in the song and its measures the system can adjust the notes to the tempo and rhythm of music 107 that has numerous or varied tempo changes.

Multiple different inaudible tones may be associated with the different information outlined herein. The inaudible tones may facilitate teaching, learning, playing, or otherwise being involved with music playing, practice, or theory. For example, the inaudible tones may be embedded in the soundtrack of a broadcast. The inaudible tones may be delivered through any number of transmissions utilizing digital or analog communications standards, protocols, or signals. For example, the inaudible tones may represent markers resulting in the ability to play back and display sheet music notes 109 on time and synchronized with the music.

The music 107 or song data may include artist, title, song notes, tablature, and other information for a specific piece of music are transmitted from the song data contained in the inaudible tones via a network broadcast, wireless signal, satellite signal, terrestrial signal, direction connection, peer-to-peer connection, software based communication, via a music player, to a device, mobile device, wearable, e-display, electronic equalizer, holographic display, projected, or streamed to a digital sheet music stand or other implementation that visually displays the notes 109 and tempo that each specific instrument will play.

Through the user interface 106, a digital display, or visually projected musical representation each instrument and its associated notes 109 may be displayed in unison as the piece of music 107 plays. In one embodiment, each instrument in a musical piece 107 may be is assigned a color indicator or other visual representations. The display may also be selectively activated to highlight specific instrumental musical pieces. The instrument and representative color is visually displayed in a musical staff in standard musical notation format or in single or grouped notes 109 format that represent one or a chorded group of the 12 known musical notes A-G # or may be visually displayed as a standard tablature line that that displays the musical notes 109 in a number-based tablature format. The information in the inaudible tones may be utilized to audibly, visually, or tactilely communication musical notes, song transcription, musical notations, chords, and other applicable information as detailed herein.

In one embodiment, one of the devices 101 may be a car radio. The car radio may display the notes 109 of the music 107. The system 100 may be effective in communicating the inaudible tones to any device within range to receive the inaudible tones. For example, the range of the inaudible tones may be only be limited by the acoustic and communications properties of the environment.

Live Music Capture, Execution, and Marking: In one embodiment, the system 100 utilizes a software-based sound capture process that is compatible with the devices 101 used to capture the inaudible tone song data. The devices 101 may capture the inaudible tone song data and in real-time capture, produce and analyze a real-time progression of the actual visual musical piece 107 in conjunction with the piece 107 being played by a live band, live orchestra, live ensemble performance, or other live music environment. The sound capture devices 101 that capture the inaudible song data may also capture each live instrumental note as it is played by a single instrument or group of performers' and is indicated with a visual representation that indicates a played note 105 is on time with the software based internal metronome marking the time in a musical piece 107.

The system 100 may indicate if each note 105 is played correctly which displays the note 105 in green as a correctly executed note, or if the note 105 is off beat or incorrect the note 109 displays red on the metronome tick as an incorrectly executed note, the metronome may also indicate if a specific instruments note was played too fast or too slow. The system 100 may also generate a report for each instrument and each instrumentalist's overall success rate for each note, timing, and other performance characteristics as played in a musical score. The report may be saved or distributed as needed or authorized.

Musical Accompaniment Suggestions: The system 100 may also make rhythmic or tempo based suggestions in addition to suggest new musical accompaniment that isn't included or heard in the original music piece 107. For example, the suggestions may be utilized to teach individuals how to perform improvisation and accompaniment. The system 100 may group specific instruments and may also indicate where other instruments may be added to fit into a piece of music 107. The system 100 may also make recommendations where new musical instrumental elements might fit into an existing piece of music 107. This also includes suggested instrumental or vocal elements, computer generated sounds, or other musical samples. The system 10 may indicate where groups of instruments share the same notes and rhythm pattern in the music 107. The system 100 may allow conductors or music composers to create and modify music 107 in real-time as it is being played or created.

Figure 2:
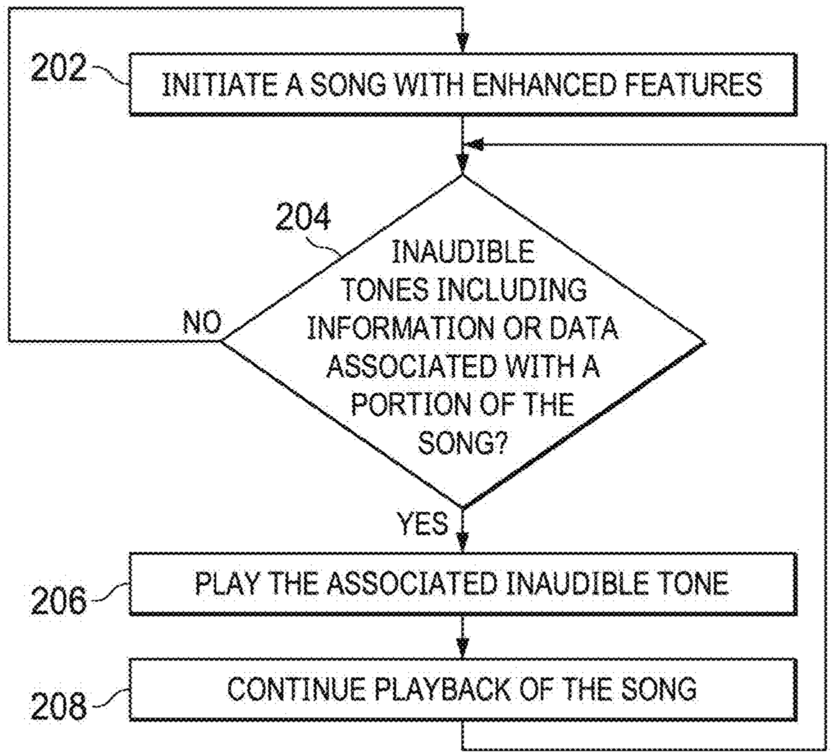
FIG. 2 is a flowchart of a process for utilizing inaudible tones in accordance with an illustrative embodiment.

FIG. 2 is a flowchart of a process for utilizing inaudible tones in accordance with an illustrative embodiment. In one embodiment, a song or audio file may represent electronic sheet music, songs, teaching aids, digital music content, or any type of musical content. The process of FIG. 2 may be performed by an electronic device, system, or component. For example, a personal computer (e.g., desktop, laptop, tablet, etc.), wireless device, DJ system, or other device may be utilized. The process of FIG. 2 may begin by initiating a song, with enhanced features (202). The song may be initiated for audio or visual playback, display, communication, review, teaching, projection, or so forth. In one example, the song may be initiated to teach an orchestral group of a middle school the song. The song may include a number of parts, notes, and musical combinations for each of the different participants. The song may also represent a song played for recreation by a user travelling in a vehicle (e.g., car, train, plane, boat, etc.).

Next, the device determines whether there are inaudible tones including information or data associated with a portion of the song (step 204). Step 204 may be performed repeatedly for different portions or parts of the song corresponding to lines, measures, notes, flats, bars, transitions, verse, chorus, bridge, intro, scale, coda, notations, lyrics, melody, solo, and so forth. In one embodiment, each different portion of the song may be associated with inaudible information and data.

Next, the device plays the associated inaudible tone (step 206). The inaudible tone may be communicated through any number of speakers, transmitters, emitters, or other output devices of the device or in communication with the device.

In one embodiment, the inaudible tone is simultaneously broadcast as part of the song. The inaudible tones represent a portion of the song that is unhearable by the listeners.

Next, the device continues playback of the song (step 208). Playback is continued until the song has been completed, the user selects to end the process, or so forth. In one embodiment, during step 208, the device may move from one portion of the song to the next portion of the song (e.g., moving, from a first note to a second note). As noted, the playback may include real-time or recorded content. In one example, the content is a song played by a band at a concert. In another example, the content may represent a classical orchestral piece played from a digital file.

Next, the device returns again to determine whether there is inaudible information or data associated with a portion of the song (step 204). As noted, the process of FIG. 2 is performed repeatedly until the song is completed.

Figure 3:
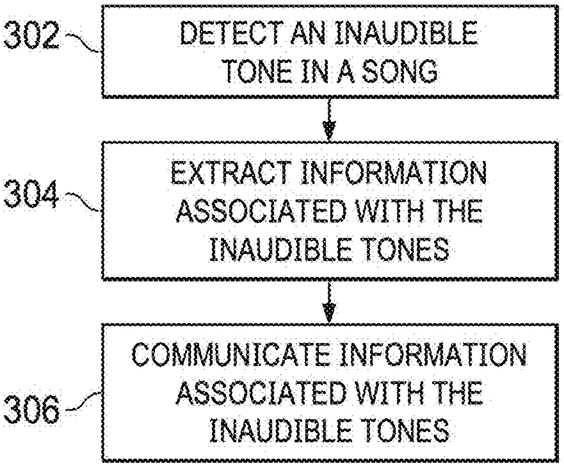
FIG. 3 is a flowchart of a process for processing inaudible tones in accordance with an illustrative embodiment.

FIG. 3 is a flowchart of a process for processing inaudible tones in accordance with an illustrative embodiment. The process of FIG. 3 may be performed by any number of receiving devices. In one embodiment, the process may begin by detecting an inaudible tone in a song (step 302). The number and types of devices that may detect the inaudible tones is broad and diverse. The devices may be utilized for learning, teaching, entertainment, collaboration, development, or so forth.

Next, the device extracts information associated with the inaudible tones (step 304). The data and information may be encoded in the inaudible tones in any number of analog or digital packets, protocols, formats, or signals (e.g., data encryption standard (DES), triple data encryption standard, Blowfish, RC4, RC2, RC6, advanced encryption standard). Any number of ultrasonic frequencies and modulation/demodulation may be utilized for data decoding, such as chirp technology. The device may utilize any number of decryption schemes, processes, or so forth. The information may be decoded as the song, is played. As previously noted, the information may be synchronized with the playback of the song. In some embodiments, network, processing, and other delays may be factored in to retrieve the information in a timely manner for synchronization. For example, the inaudible tones may be sent slightly before a note is actually played so that step 306 is being performed as the associated note is played.

Next, the device communicates information associated with the inaudible tones (step 306). In one embodiment, the device may display each note/chord of the song as it is played. For example, a zoomed visual view of the note and the text description may be provided (e.g., see for example note 109 of FIG. 1). The information may also be displayed utilizing tactile input, graphics, or other content that facilitate learning, understanding, and visualization of the song. The communication of the information may help people learn and understand notes, tempo, and other information associated with the song. During step 306, the device may also perform any number of actions associated with the inaudible tones.

In one embodiment, the device may share the information with any number of other devices proximate the device. For example, the information may be shared through a direct connection, network, or so forth.

Figure 4:
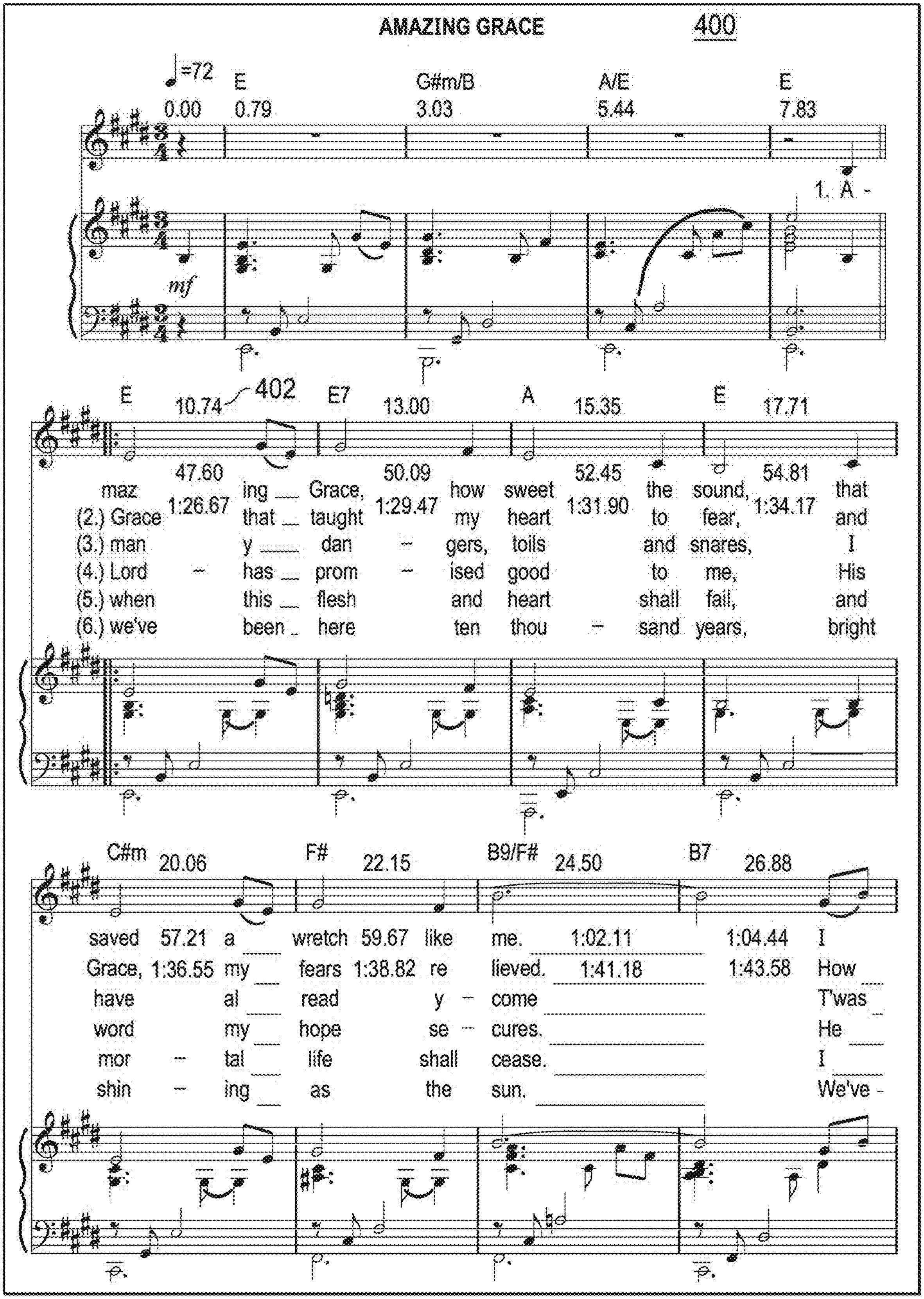
FIGS. 4 and 5 are a first embodiment of sheet music including notations for utilizing a system in accordance with illustrative embodiments.
Figure 5:
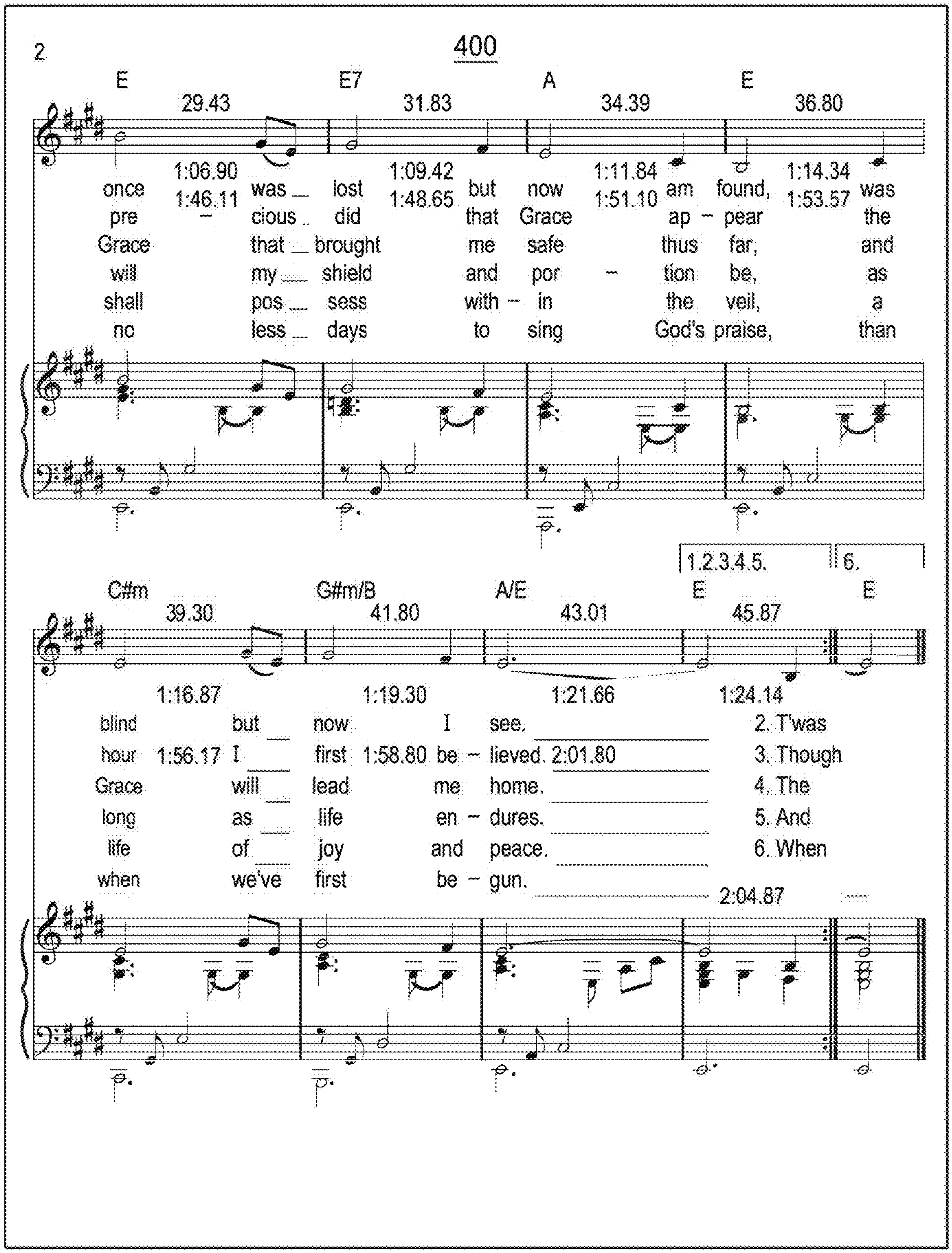
Figure 6:
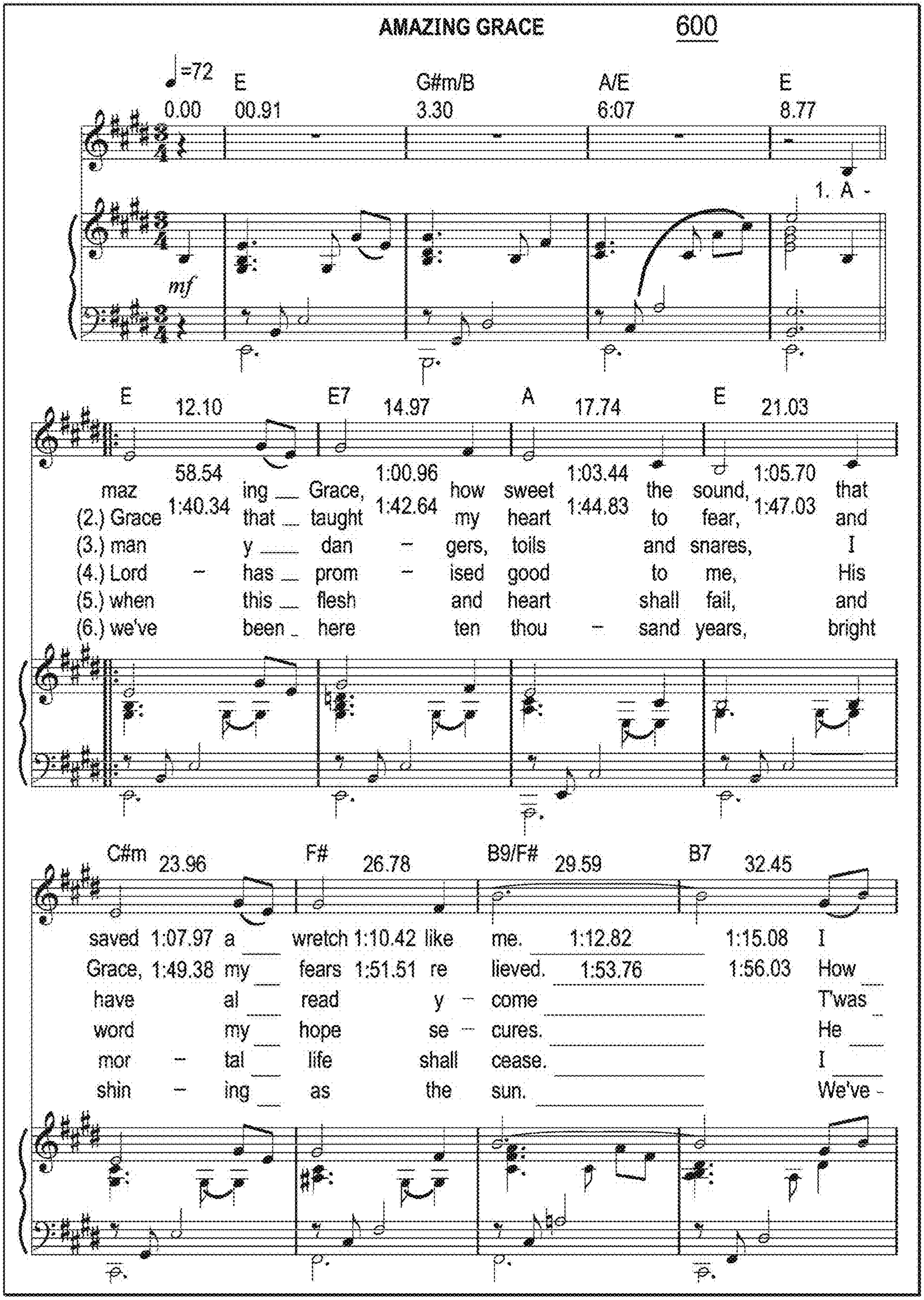
FIGS. 6 and 7 are a second embodiment of sheet music including notations for utilizing an inaudible system in accordance with illustrative embodiments.
Figure 7:
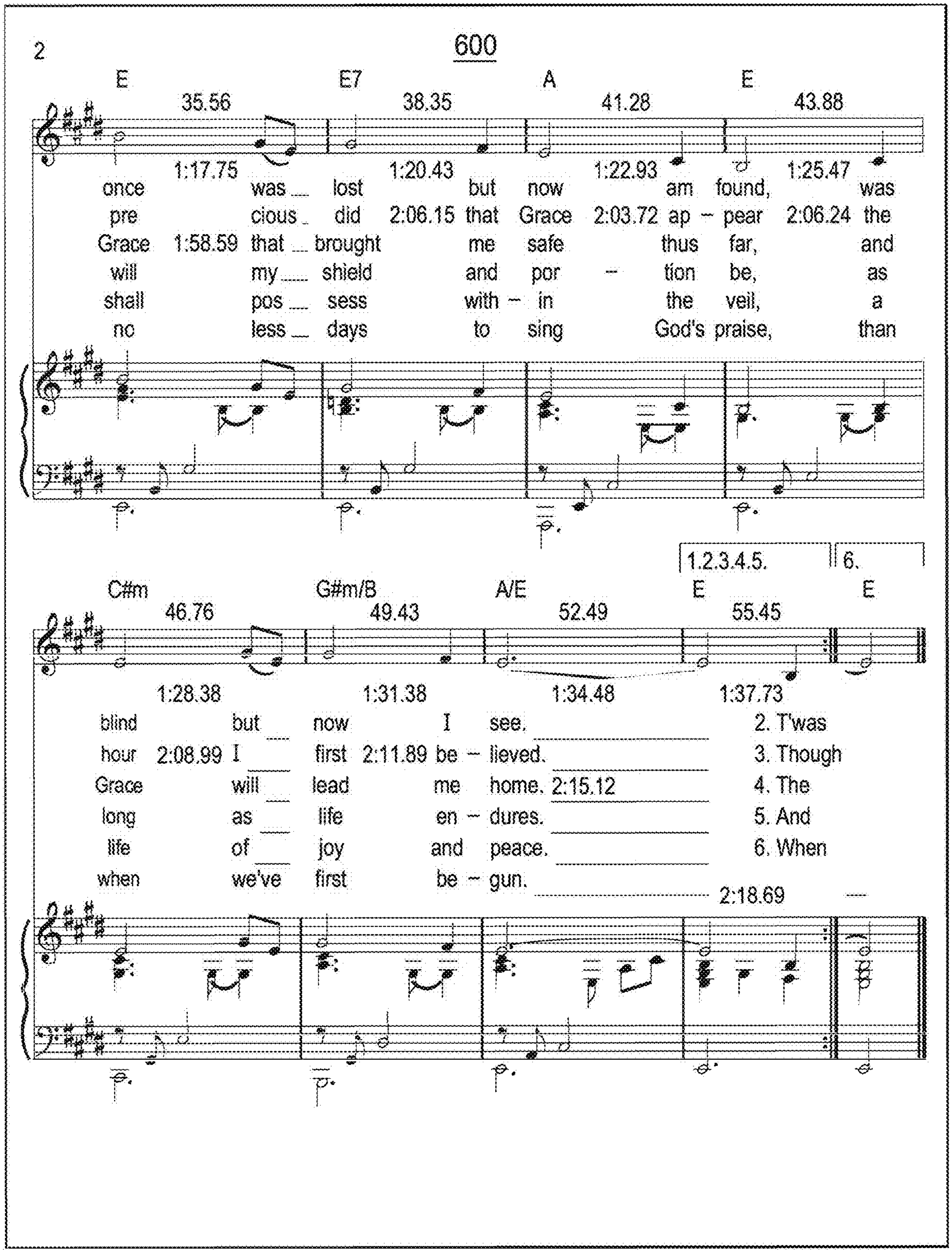

FIGS. 4 and 5 are a first embodiment of sheet music 400 including notations for utilizing a system in accordance with illustrative embodiments. FIGS. 6 and 7 are a second embodiment of sheet music 600 including notations for utilizing an inaudible system in accordance with illustrative embodiments. The embodiments shown in FIGS. 4-7 represent various versions of Amazing Grace. In one embodiment, time codes 402 of the measures (bars) and tempo show how the illustrative embodiments utilize indicators to display music. In one embodiment, the indicators may each be associated with inaudible tones. For example, at time code 10.74 the inaudible tone may communicate content to display the note "e" visually as well as textually. As shown by the time codes 402 any number of note/chord combinations may also be displayed. In addition, the time codes 402 may be applicable to different verses of the song.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM) erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wireless personal area network (WPAN), or a wide area network (WAN), or the connection may be made to an external computer (e.g., through the Internet using an Internet Service Provider).

Figure 8:
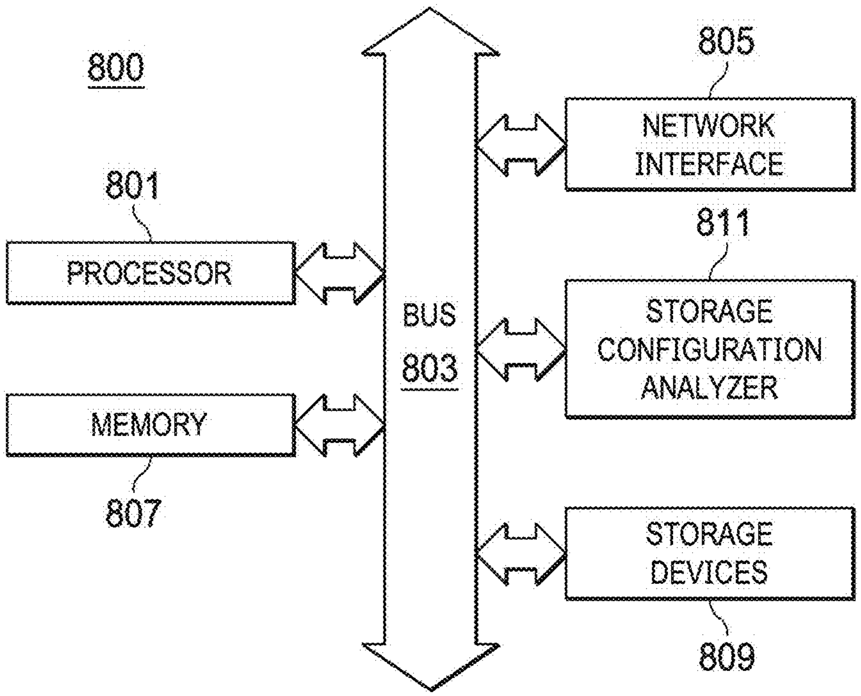
FIG. 8 depicts a computing system in accordance with an illustrative embodiment.

FIG. 8 depicts a computing system 800 in accordance with an illustrative embodiment. For example, the computing system 800 may represent a device, such as the wireless device 102 of FIG. 1. The computing system 800 includes a processor unit 801 (possibly including multiple processors, multiple cores, multiple nodes, and/or implementing multi-threading, etc.). The computing system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.), and a storage configuration analyzer 811.

The system memory 807 embodies functionality to implement all or portions of the embodiments described above. The system memory 807 may include one or more applications or sets of instructions for implementing a communications engine to communicate with one or more electronic devices or networks. The communications engine may be stored in the system memory 807 and executed by the processor unit 801. As noted, the communications engine may be similar or distinct from a communications engine utilized by the electronic devices (e.g., a personal area communications application). Code may be implemented in any of the other devices of the computing system 800. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, the storage configuration analyzer 811, and the network interface 805 are coupled to the bus 803. Although illustrated as being coupled to the bus 803, the memory 807 may be coupled to the processor unit 801. The computing system 800 may further include any number of optical sensors, accelerometers, magnetometers, microphones, gyroscopes, temperature sensors, and so forth for verifying user biometrics, or environmental conditions, such as motion, light, or other events that may be associated with the wireless earpieces or their environment.

The illustrative embodiments may be utilized to track electronic and audio delivery of audio content including songs, music, podcasts, speeches, audible books, musical compositions, performance, and other online or digital content. The publishing and licensing rights of the artists, authors, performers, distributors, marketers, publishers, and other interested parties. The illustrative embodiments perform various methods to critical to track performance, utilization, distribution, sales, playback, of the audio content to ensure that monetization is performed correctly and as anticipated. As a result, the interested parties may control, manage, regulate, and account for communication, distribution, and utilization of their audio content across a full spectrum of physical, in-person, and online media delivery and playback systems.

Figure 9:
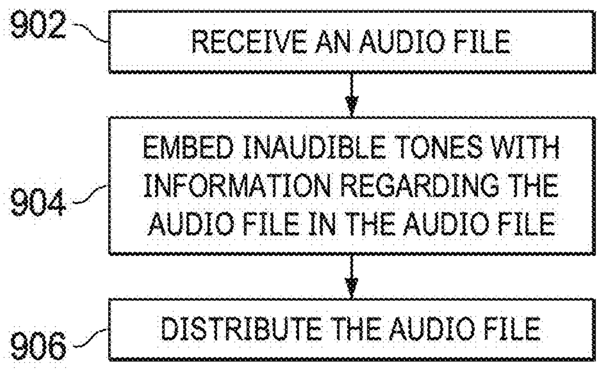
FIG. 9 is a flowchart of a process for embedding inaudible information in an audio file in accordance with an illustrative embodiment.

FIG. 9 is a flowchart of a process for embedding inaudible information in an audio file in accordance with an illustrative embodiment. The process of FIGS. 9 and 10 may be performed by a smart phone, tablet, gaming device, laptop, personal computer, server, network, platform, website, cloud system, or other electronic device referred to as a "system". The process may begin receiving an audio file (step 902). The audio file may represent a song, musical composition, recording, advertisement, digital/analog version, mp3, or other file. In addition to audio content, the audio file may also include video, text, data, augmented reality, virtual reality, or other content. The audio file may be received through one or more networks, signals, protocols, or directly from any number of devices. During step 902, the audio file may also be generated or otherwise created. In one embodiment, the audio file may represent a master copy. However, the audio file may also represent copies or other content.

Next, the system embeds inaudible tones with information regarding the audio file in the audio file (step 904). The information included within the inaudible tones may include music publishing rights data, content, metadata, links, instructions, and information. During step 904, the audio file may also be created, re-created, generated, or integrated to include the audio content and applicable inaudible tone(s). For example, the audio file may be created with the one or more inaudible tones. In another example, an existing audio file may be modified to incorporate the one or more inaudible tones. The audio file and associated copies, duplicates, or other versions may all include the inaudible tones. Alternatively, each separate copy, duplicate, or version may have a unique inaudible tone and/or identifier included as part of the inaudible tone and/or file name/dentifier. The inaudible tones may include publishing rights information and may be included in any portion of the song or audio file (intro, verse, refrain, pre-chorus, bridge, solo, breakdown, extro/coda, credits, etc.) without any degradation to the quality of the recording or audio file. The inaudible tones may be added at the time of creation, distribution, or post-production song mastering.

The information and data included in the inaudible tones may include specific publishing rights information that is unique to each song composition and may include the artist, author, genre, title, album, song data, song publisher/distributor, song copyright, mechanical license fees, artist royalties, synchronization license fees, instrumental synchronization license, sample clearing fees, tablature reproduction fees, sheet music publishing fees, stock music fees, links to related videos, album art, file format, file size, included inaudible information/data, or other content associated with the song. The information may also includes links, song-plays, web-prompts, and other applicable data. The different types of licenses implemented may include music/audio licensing rights, micro-licensing rights, synchronization licenses, mechanical licenses, master licenses, public performance licenses, print rights licenses, and theatrical licenses. In one embodiment, step 904 is performed prior to releasing the audio file for distribution, once copied or duplicated, or upon another process.

Next, the system distributes the audio file (step 906). In one embodiment, the audio file is released for distribution, playback, or communication in response to the inaudible tone being embedded in the audio file. During step 906, the audio file may also be played to one or more users. For example, a playback device, such as a computing device and a connected speaker system may be utilized to play the audio file and associated inaudible tones. The inaudible tones may be utilized to track the creation, distribution, and utilization of the audio file. For example, the inaudible tones may be utilized to manage, control, and otherwise process the monetization of the audio file through payments, royalties, distributions, or other types of transactions (e.g., currency, cryptocurrency, credits, etc.).

Figure 10:
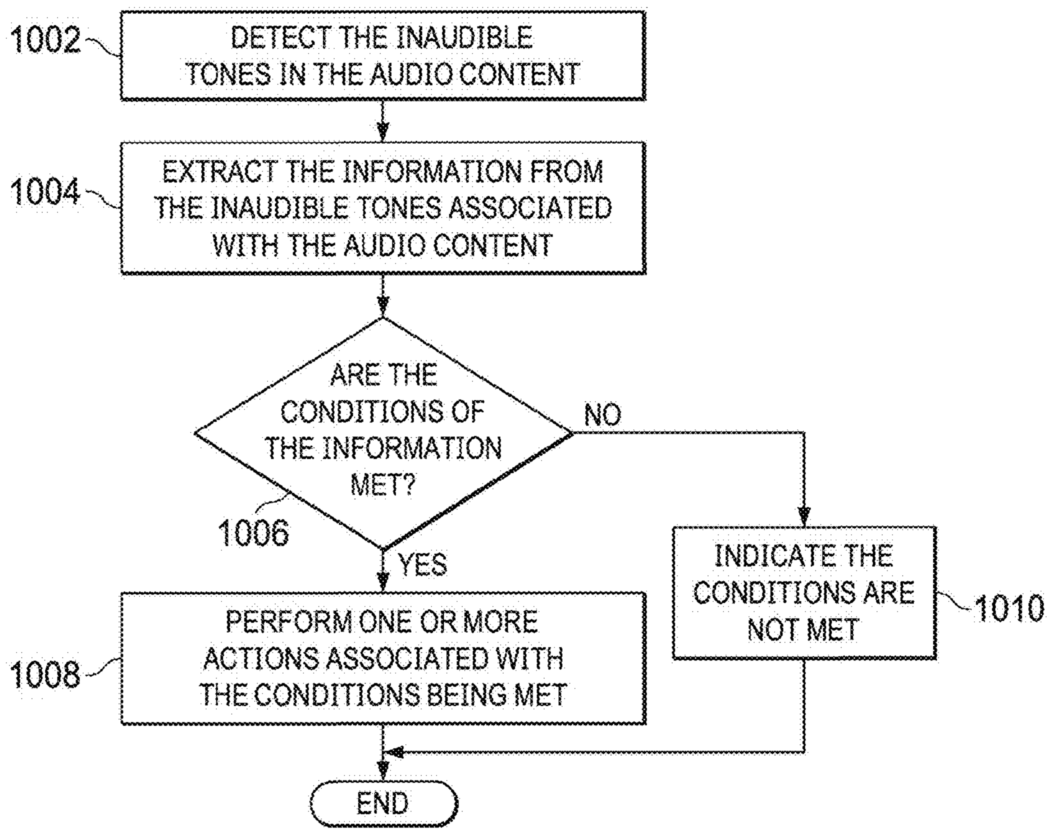
FIG. 10 is a flowchart of a process for performing actions associated with inaudible tones in accordance with an illustrative embodiment.

FIG. 10 is a flowchart of a process for performing actions associated with inaudible tones in accordance with an illustrative embodiment. The process of FIG. 10 may be performed by any of the previously mentioned computing or communications devices. For example, a microphone or sensor of the device may process audio content and inaudible tones.

The process of FIG. 10 may begin by detecting the inaudible tones in the audio content (step 1002). The audio content may represent the live or electronic performance, playback, implementation, or execution of the audio file. In one embodiment, the system may receive (e.g., through air propagation received by a microphone) audio content with inaudible tones. For example, the system may detect the inaudible tones based on over-air playback. Any number of hardware, devices, and/or applications/software may be utilized to detect the inaudible tones. In one embodiment, the inaudible tones may be detected by any number of devices that operate proactively or passively. For example, applications that are executed in the background of a device may capture, sense, or otherwise detect inaudible tones. Any number of smart assistants or devices (e.g., Alexa, Siri, Cortana, Google, etc.), security systems, smart home systems, vehicle systems, broadcast systems, and other components, devices, systems, network, or equipment may detect the inaudible tones.

Next, the system extracts the information from the inaudible tones associated with the audio content (step 1004). The inaudible tones may extract the data, information, and conditions associated with the applicable information. For example, the system may extract the applicable publishing and distribution information associated with the audio content. For example, besides specifying the title, length, publisher/distributor, writer, singer, and song information, information regarding the paid, pending, or required royalties may also be communicated. In one embodiment, each unique data element embedded inside of the unique inaudible tone(s) may be decoded by the system or device. For example, each unique inaudible tone may be tracked and decoded as played or otherwise delivered as part of the progression of the song, music, or audio file.

The information may also provide copyright information relevant to the song or album including, but not limited to, owners of the copyright, original writer, singer, band members, performer, copyright percentages, lyrical and production credit splits, ownership changes and history, and so forth. As a result, all interested parties including artists/performers/musicians/writers, producers, publishing agents, distributors, and so forth may be compensated.

Utilization of the inaudible tones provides interested parties the ability to sample playback and distribution of their songs in different scenarios for tracking utilization, monetization, distribution, digital rights management, copyright compliance, and other applicable information. The system may sample songs and other audio content at numerous locations to determine compliance with legal conditions and agreements associated with the audio file/content. The inaudible tones may be incorporated in visual sheet music, musical piece displays, live music capture, executing, and marking of audio content. The inaudible tones may also be integrated in communications played by instruments, music accessories (e.g., metronomes, tuners, speakers, amplifiers, cases, etc.). The inaudible tones may also carry information regarding location, proximity, type of instrument/device, performance information, instructions, limitations, octave/scale/range, notes, and so forth. The inaudible tones may be played as part of the audio content or may be played based on conditions, status information, a pattern, time intervals, or so forth.

Next, the system determines whether the conditions of the information are met (step 1006). The conditions may include any number of factors, parameters, rules, factors, laws, indications, or applicable conditions. For example, the conditions may specify how, when, where, a number of times, required equipment, or by whom the audio content may be played or performed. Certain conditions may be associated with the payment, purchase, license, royalties, copyright, or agreement under which the audio content is created, distributed or performed.

If the system determines the conditions of the information are met during step 1006, the system performs one or more actions associated with the conditions (step 1008) In one embodiment, a media player may determine whether the inaudible tone authorizes payback of the audio content and continues with playback of the inaudible content. The lack of the inaudible content may indicate that the audio content has been stolen, unlawfully copied, or so forth (preventing the audio content from being played see step 1008). In one embodiment, the conditions may specify whether the song may be edited, remixed, or revised as part of the actions of step 1008. The conditions may also specify the conditions under which the audio content may be published, performed/played, and distributed.

If the conditions of the information are not met during step 1006, the system indicates the conditions are not met (step 1010). In one embodiment, a communication or message indicating non-compliance with conditions in the information of the inaudible tones. For example, the communication may be a text, email, or in-application message that is displayed to the person, individuals, group, or other party that is playing or distributing the audio content with the associated inaudible tones. In another example, the system may send a message to an authorized party indicating that the conditions included in the inaudible tones are not being met. In another embodiment, the system may also perform one or more actions associated with the conditions not being met. For example, playback of the audio content may be stopped, restricted, or otherwise limited. In another example, the system may prompt the user to obtain or renew a license, pay applicable fees, licenses, or royalties, or comply with other conditions. The system may manage applicable communications, messages, or actions through a media player.

Figure 11:
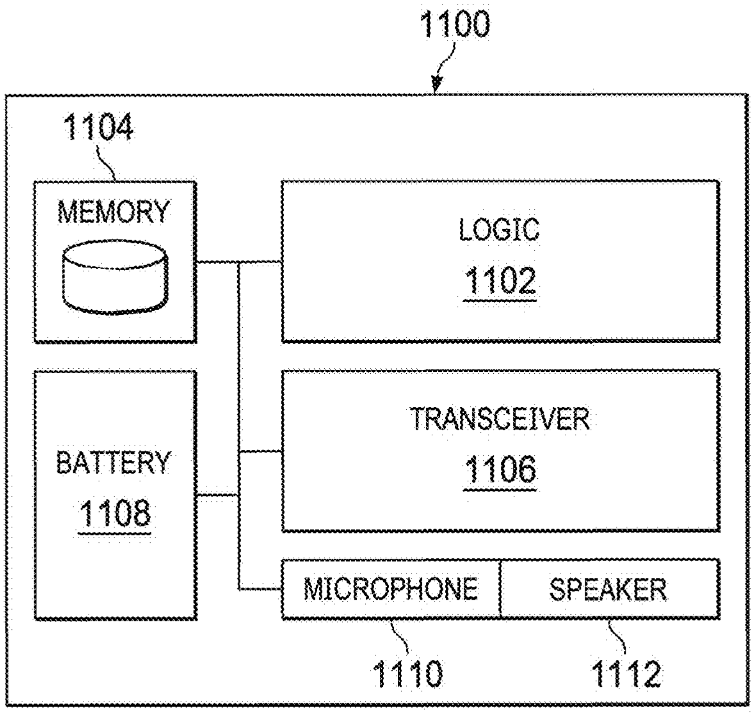
FIG. 11 is a pictorial representation of a sticker using an inaudible tone in accordance with an illustrative embodiment.

FIG. 11 is a pictorial representation of a sticker 1100 using an inaudible tone in accordance with an illustrative embodiment. The sticker 1100 may also represent an inaudible tones device that does not require the size, shape, and functionality of a sticker. For example, the inaudible tones device may be built in or attached to instruments, sheet musical/tablature, musical accessories, or so forth. In one embodiment, the sticker 1100 may include logic 1102, a memory 1104, a transceiver 1106, a battery 1108, a microphone 1110, and a speaker 1112. In one embodiment, the sticker 1100 or another device including the components of the sticker 1100 may be utilized to perform the process of FIGS. 2-4 or 9-10. The sticker 1100 may represent a stand-alone device or components or may be adhered, attached to, or integrated with tablature, sheet music, musical instruments, tablets, cell phones, circuits, smart watches, wearables, or commonly used musical accessories, components, or devices. As previously noted, the sticker 1100 may communicate an inaudible tone or signal that may be detected by one or more sensors or receivers. In another embodiment, the sticker 1100 may act as a sensor or receiver for receiving inaudible tones.

The sticker 1100 may transmit or receive a unique inaudible tone or may be assigned a unique inaudible tone. For example, the inaudible tone may be associated with music, parts, musical instruments, or so forth, is assigned to the user and associated wearable components of the user. The inaudible tones and associated information may be assigned, programmed, or reprogrammed to provide added functionality. The sticker 1100 may also receive specific inaudible tones. The sticker 1100 may be capable of utilizing the speaker 210 to communicate a full spectrum of inaudible tones. For example, the speaker 210 may represent a specialized speaker. The speaker 210 may include signal generators, filters, and amplifiers for generating the inaudible tones. In one embodiment, the logic 1102 may be utilized to assign the inaudible tone(s) broadcast and received by the transceiver 1106. The logic 1102 may also control the information communicated in the inaudible tones. Variations in the inaudible tones (e.g., frequency variations) may be utilized to encode data or other information. Any number of other encoding protocols, standards, or processes may also be utilized to include small or large amounts of data.

In addition, the sticker 1100 may be updated or modified in real-time, offline, or as otherwise necessary to utilize new or distinct inaudible tones. For example, the sticker 1100 may represent a sticker or chip attached to different types of music. The sticker 1100 may be reprogrammed or updated as needed. As a result, the sticker 1100 may be reusable.

The memory 1104 may also be utilized to store and send data associated with the inaudible tone(s) and sticker 1100. The data encoded in the inaudible tone(s) may include information about a song, writer/artist/band/performers, credits, ownership, licenses/royalties, distribution and performance requirements and rights, contact information, and device information. The sticker 1100 is fully customizable and capable of communicating an embedded, carrier, multi-frequency signal range, multiple interval signal patterns, or any varied range of inaudible signals and tones (as well as other radio or optical frequencies). In one embodiment, the initial spectrum of inaudible tone patterns, not including intervals or combined patterns, may include any number of signals. In one embodiment, specific inaudible signal ranges may be dedicated for specific purposes or specific types of information.

In one embodiment, the sticker 1100 for specific musical items (e.g., songbook, instruments, tablature, accessories, etc.), users, or devices are associated with specific frequencies of inaudible tones. The inaudible tones broadcast by the speaker 1112 and received by the microphone 1110 may identify the associated item, user, or device. In one example, a specific inaudible tone may be dedicated for music and music related applications. Other inaudible tones may be utilized for instrument or device specific information. For example, the sticker 1100 may be attached or integrated with a songbook, tablature, musical instruction manual, sheet music, or so forth. In one example, a specific inaudible tone may be utilized to teach or provide musical instruction whereas a separate inaudible tone may be utilized to learn or as a student of music. The different data may be pre-identified or associated with an end-user or multiple users.

The sticker 1100 may also be utilized to track musical instruments, sheet music/books/tablature, accessories, individuals, and so forth. The inaudible tones may be utilized in crowded, loud, or full areas to send and receive applicable information through the inaudible tones. Category based inaudible tones may be pre-designated in the system and may represent a multitude of categories. The sticker 1100 may utilize static inaudible tones or dynamic tones that change based on needs or circumstances. For example, different conditions, parameters, factors, settings, or other requirements (e.g., time of day, location, detected instruments, proximity of instruments/devices/users, music being played, audible commands, beacons, etc.) may specify when and how each of the inaudible tones is communicated. For example, different inaudible tones may be associated with different users playing a device or music (e.g., the transceiver may detect proximity of a cell phone/wearable associated with the user).

The sticker 1100 may also be integrated in musical accessories. In one embodiment, the sticker 1100 may be integrated in a case, stand, chair, display, magnetic unit, or label. The sticker 1100 may include buttons, snaps/hooks, or adhesives for permanently or temporarily attaching the sticker 1100 to a user, object, device, item, structure, or so forth.

The logic 1102 is the logic that controls the operation and functionality of the sticker 1100. The logic 1102 may include circuitry, chips, and other digital logic. The logic 1102 or the memory 1104 may also include programs, scripts, and instructions that may be implemented to operate the logic 1102. The logic 1102 may represent hardware, software, firmware, or any combination thereof. In one embodiment, the logic 1102 may include one or more processors. The logic 1102 may also represent an application specific integrated circuit (ASIC) or field programmable gate array (FPGA). In one embodiment, the logic 1102 may execute instructions to manage the chip including interactions with the components of the sticker 1100.

The logic 1102 may control how and when the sticker 1100 broadcasts and receives inaudible tones. The logic 1102 may utilize any number of factors, settings, or user preferences to communicate utilizing the inaudible tones. For example, the user preferences may specify an inaudible tone, transmission strength (e.g., amplitude), transmission frequency, and so forth.

The memory 1104 is a hardware element, device, or recording media configured to store data or instructions for subsequent retrieval or access at a later time. For example, the memory 1104 may store data that is broadcast as part of the inaudible signals. The memory 1104 may represent static or dynamic memory. The memory 1104 may include a hard disk, random access memory, cache, removable media drive, mass storage, or configuration suitable as storage for data, instructions, and information. In one embodiment, the memory 1104 and the logic 1102 may be integrated. The memory 1104 may use any type of volatile or non-volatile storage techniques and mediums. The memory 1104 may store information related to the inaudible tones. The inaudible tones may also store the status of a user, sticker 1100 or an integrated device, such as communications device, computing device, or other peripherals, such as a cell phone, smart glasses, a smart watch, a smart case for the sticker 110), a wearable device, and so forth. In one embodiment, the memory 1104 may display instructions, programs, drivers, or an operating system for controlling a user interface (not shown) including one or more LEDs or other light emitting components, speakers, tactile generators (e.g., vibrator), and so forth. The memory 1104 may also store thresholds, conditions, signal or processing activity, proximity data, and so forth. The memory 1104 may store the information that is transmitted as the inaudible signal. For example, the data in the memory 1104 associated with one or more inaudible tones may be converted to an inaudible tone by the speaker 1112 (or alternatively by the transceiver 1106).

The transceiver 1106 is a component comprising both a transmitter and receiver which may be combined and share common circuitry on a single housing. In another embodiment, the transceiver 1106 may communicate inaudible signals utilized as herein described. In other embodiments, the transceiver 1106 may also communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 1106 may also be a hybrid or multi-mode transceiver that supports a number of different communications. For example, the transceiver 1106 may communicate with a sensor utilizing inaudible signals and with a wireless device utilized by a user utilizing NFC, or Bluetooth communications. The transceiver 1106 may also detect amplitudes and signal strength to infer distance between the sticker 1100 and other users/devices/components. The transceiver 1106 may also refer to a separate transmitter and receiver utilized by the sticker 1100.

The microphone 1110 coverts inaudible and audible sound waves into electrical energy to extract applicable information. The logic 1102 retrieves information from the electrical signals detected from the inaudible tones. The information may then be displayed, communicated, played, decrypted, or otherwise processed.

The components of the sticker 1100 may be electrically connected utilizing any number of wires, contact points, leads, busses, wireless interfaces, or so forth. In addition, the sticker 1100 may include any number of computing and communications components, devices or elements which may include busses, motherboards, printed circuit boards, circuits, chips, sensors, ports, interfaces, cards, converters, adapters, connections, transceivers, displays, antennas, and other similar components. Although not shown, the sticker 1100 may include a physical interface for connecting and communicating with other electrical components, devices, or systems. The physical interface may include any number of pins, arms, or connectors for electrically interfacing with the contacts or other interface components of external devices or other charging or synchronization devices. For example, the physical interface may be a micro USB port. In one embodiment, the physical interface is a magnetic interface that automatically couples to contacts or an interface. In another embodiment, the physical interface may include a wireless inductor for charging a battery 1108 of the sticker 1100 without a physical connection to a charging device. The physical interface may allow the sticker 1100 to be utilized as a remote microphone and sensor system (e.g., seismometer, thermometer, light detection unit, motion detector, audio recorder, etc.) when not being utilized as a transmitter. For example, measurements, such as noise levels, temperature, movement, and so forth may be detected by the sticker 1100 even when not worn. In another example, the sticker 1100 may be utilized as a temporary security system recording motion and audio detected in an associated location.

In one embodiment, the sticker 1100 may include a battery 1108. The battery 1108 is a power storage device configured to power the sticker 1100. In other embodiments, the battery 1108 may represent a fuel cell, thermal electric generator, piezo electric charger, solar cell, ultra-capacitor, or other existing or developing power storage or generation technologies. The logic 1102 preserves the capacity of the battery 1108 by reducing unnecessary utilization of the chip in a full-power mode when there is little or no benefit to the user (e.g., there is no reason to transmit, the information has already been received, the sticker 1100 is out-of-range of a receiving device, etc.). In one embodiment, the battery 1108 or power of the sticker 1100 is preserved to broadcast the inaudible signals when entering or leaving a room.

Although not shown, the sticker 1100 may include any number of sensors (e.g., orientation, acceleration, motion, etc.), navigation devices (e.g., global positioning systems, wireless triangulation, etc.), or other sensors. For example, the sticker 1100 may activate all or portions of the components in response to determining the sticker 1100 is being moved or based on the location.

The receivers, sensors, or tone transmitters may include all or portions of the components of the sticker 1100 (the description is equally applicable). In one embodiment, the tone transmitters may utilize a specialized application or logic to identify the inaudible tones utilizing an on-board memory or access to remote devices, database, or memories. The network connection may also be utilized to communicate updates for tracking the inaudible tones/transmitters throughout the location, updating applicable information, sending indicators, alerts, or messages, or performing other communications. For example, the receiver may include a hybrid transceiver for both wireless and wired communications with a processing system, cloud network, cloud system or so forth.

In another embodiment, the sticker 1100 may be powered by movement (e.g., piezo electric generators), solar cells, external signals (e.g., passive radio frequency identification signals), an external device (e.g., or miniature power sources associated with a device or user.

The illustrative embodiments are not to be limited to the particular embodiments and examples described herein. The various devices, processes, methods, and embodiments may be combined across Figures and descriptions. In particular, the illustrative embodiments contemplate numerous variations in the type of ways in which embodiments of the invention may be applied to music teaching, playback, and communication utilizing inaudible tones. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments disclosed with greater particularity.

What is claimed is:

1. A method for processing inaudible tones, comprising:

receiving content from one or more sources;

detecting one or more inaudible tones included in the content;

extracting information associated with the one or more inaudible tones from the content;

determining usage information associated with the content in response to the information, the usage information includes at least 1) licensing information, and 2) content information, the usage information also includes a geographic location where the content is played and a time of day the content is played; and communicating the usage information including at least the licensing information, and the content information to one or more of copyright owners, licensing entities, or parties with an ownership or controlling interest in the content in response to detecting the one or more inaudible tones in the content.

2. The method of claim 1, wherein the one or more sources are broadcasting the content including at least audio content.

3. The method of claim 1, wherein the one or more inaudible tones are detected by one or more microphones.

4. The method of claim 1, wherein the licensing information includes at least song-plays, the geographic location where the one or more inaudible tones are detected, and parties associated with the one or more sources.

5. The method of claim 1, wherein the information includes at least the one or more performers, and music associated with the content.

6. The method of claim 1, wherein the information includes title, length, and writer.

7. The method of claim 1, wherein the usage information is sent to a copyright owner of the content or parties with an ownership or controlling interest in the content.

8. The method of claim 1, wherein the inaudible tones and the licensing information are utilized to ensure that playback and licensing rights of the audio file by the one or more sources are authorized.

9. The method of claim 1, further comprising:

detecting one or more inaudible tones in the audio file;

extracting the information associated with the one or more inaudible tones of the audio file;

determining whether conditions associated with the information are met;

performing one or more actions associated with the conditions of the information being met.

10. An inaudible tones device, comprising:

a microphone receiving content from one or more sources;

logic in communication with the microphone controlling the inaudible tones device, the logic detects one or more inaudible tones included in the content, extracts information associated with the one or more inaudible tones from the content, determines usage information associated with the content in response to the information, the usage information includes at least licensing information and content information, the usage information also includes a geographic location wherein the content is played and a time of day the content is played; and a transceiver in communication with the logic that communicates the usage information including at least 1) the licensing information and 2) content information to one or more of copyright owners, licensing entities, and parties with an ownership or controlling interest in the content in response to the logic detecting the one or more inaudible tones included in the content.

11. The inaudible tones device of claim 10, wherein the one or more sources are broadcasting the content including at least audio content, and wherein the one or more inaudible tones are detected by one or more microphones.

12. The inaudible tones device of claim 10, wherein the licensing information includes at least song-plays, geographic location the one or more inaudible tones are detected, and parties associated with the one or more sources.

13. The inaudible tones device of claim 10, wherein the usage information is sent to a copyright owner of the content or parties with an ownership or controlling interest in the content.

14. The inaudible tones device of claim 10, further comprising:

a power source in communication with the microphone, the logic, and the transceiver.

15. The inaudible tones device of claim 10, wherein the inaudible tones device is a sticker configured to adhere to a person or device.

16. An inaudible tones device, comprising:

a processor executing a set of instructions;

a memory storing the set of instructions, wherein the set of instructions are executed to:

receive content from one or more sources;

detect one or more inaudible tones included in the content;

extract information associated with the one or more inaudible tones from the content;

determine usage information associated with the content in response to the information, the usage information includes at least 1) licensing information and 2) content information, the usage information also includes a geographic location where the content is played and a time of day the content is played; and communicate the usage information including at least the licensing information and the content information to one or more of copyright owners, licensing entities, or parties with an ownership or controlling interest in the content in response to extracting the information associated with the one or more inaudible tones from the content.

17. The inaudible tones device of claim 16, wherein the one or more sources are broadcasting the content including at least audio content.

18. The inaudible tones device of claim 16, wherein the set of instructions are further executed to:

detect one or more inaudible tones in the audio file, extract the information associated with the one or more inaudible tones of the audio file, determine whether conditions associated with the information are met, and perform one or more actions associated with the conditions associated with the information being met.

19. The inaudible tones devices of claim 16, wherein the inaudible tones and the licensing information are utilized to ensure that playback and licensing rights of the audio file by the one or more sources are authorized.

20. The inaudible tones devices of claim 16, wherein the content information includes title, length, and writer.

* * * * *